June 24, 1930.  E. J. SWEETLAND  1,768,167
FILTER
Filed June 3, 1925     4 Sheets-Sheet 1

INVENTOR
ERNEST J. SWEETLAND
BY
ATTORNEYS

June 24, 1930.    E. J. SWEETLAND    1,768,167
FILTER
Filed June 3, 1925    4 Sheets-Sheet 3

INVENTOR
ERNEST J. SWEETLAND
BY
ATTORNEYS

June 24, 1930.　　　E. J. SWEETLAND　　　1,768,167
FILTER
Filed June 3, 1925　　　4 Sheets-Sheet 4

INVENTOR
ERNEST J. SWEETLAND
BY Hammond Littell
ATTORNEYS.

Patented June 24, 1930

1,768,167

UNITED STATES PATENT OFFICE

ERNEST J. SWEETLAND, OF HAZLETON, PENNSYLVANIA, ASSIGNOR TO OLIVER UNITED FILTERS INC., OF SAN FRANCISCO, CALIFORNIA, A CORPORATION OF NEVADA

FILTER

Application filed June 3, 1925. Serial No. 34,509.

The filter of which the following is a specification is designed particularly for industrial filtration purposes such as the filtration of heavy chemicals, sugar solutions, glucose, starch, petroleum oils and other materials where large quantities are to be dealt with.

It is particularly adapted for use in cases where a filter aid such as paper pulp, asbestos fibre, kieselguhr, fuller's earth, bleaching clay, and similar materials are used as an aid to filtration, and where such materials are used for the purpose of forming a coating upon screen cloth by precoating methods well known in the art or where the filter aid is used merely to facilitate collecting the impurities in suspension to facilitate obtaining a clear filtrate.

One of the principal features of this invention is to provide a filter of large size where filtration takes place under pressure in an enclosed shell, yet to have the design of the enclosing shell or casing such that it can quickly be removed to expose the filter elements for inspection or repair without the use of a crane or other hoisting facilities.

A further object of the invention is to provide a construction whereby the filter elements are rotatably mounted upon a horizontal shaft without resorting to the customary means in such filters of dividing the shell or casing and stuffing boxes horizontally.

A further object is to provide a filter with rotating leaves whereby a single stuffing box may be used and the filter elements may be conveniently removed without disturbing the packing.

A further object is to provide a filter with rotating leaves with a casing which may be removed from the leaves horizontally, thus dispensing with the high head room required where cranes and similar facilities are required to lift the casing.

A further object is to provide a filter with rotating filter elements connected with a multiple speed transmission so that more than one rate of rotation can be obtained, without changing the speed of the driving means.

A further object is to provide a rotating lead filter with a sectionalized shaft associated with filter elements made up with a plurality of sectors in such manner that in case of a leak in any of the filter elements the operator can quickly ascertain in which row of sectors the leak is located.

A further object is to provide a filter shell which is opened by horizontal movement with a connection for entrance or exit of fluids which can rapidly and conveniently be opened or closed.

A further object of the invention is to provide a filter which when opened permits inspection of the entire filter surface by an observer located in a convenient position on the floor. In large filters convenience of inspection is a very important feature and with the type herein described the leaves may be slowly rotated while the shell is removed so that the entire surface comes within the observer's view under the most convenient circumstances.

A further object is to provide a filter of the pressure type wherein the filter elements lie in a vertical plane immediately above the feed inlet which is associated with a hopper in such manner that the liquid to be filtered is perfectly distributed to the various filter elements.

A further object is to provide a filter having a discharge hopper located below the filter elements and in line with the vertical plane thereof in such manner that the filter cake when disengaged from the filter elements may rapidly be discharged from the hopper without the use of worm conveyors or other mechanical means of assisting the cake to discharge from the shell.

A further object is to provide a pressure filter having the drainage shaft divided into a plurality of sectors with means of taking samples of filtered liquid from the separate sectors and thus facilitate the location of leaks in the filter fabric.

A still further object is to provide a filter of such construction that filter elements either of the disc type or of the sector type may be used with equal convenience.

Referring to the drawings. Figure 1 is a side elevation of the machine in closed position with the filtrate receiving casting shown partially in section.

Figure 5 is a plan view of the quick-detachable feed connection which is associated with the hopper at the bottom of the filter casing.

Figure 1:
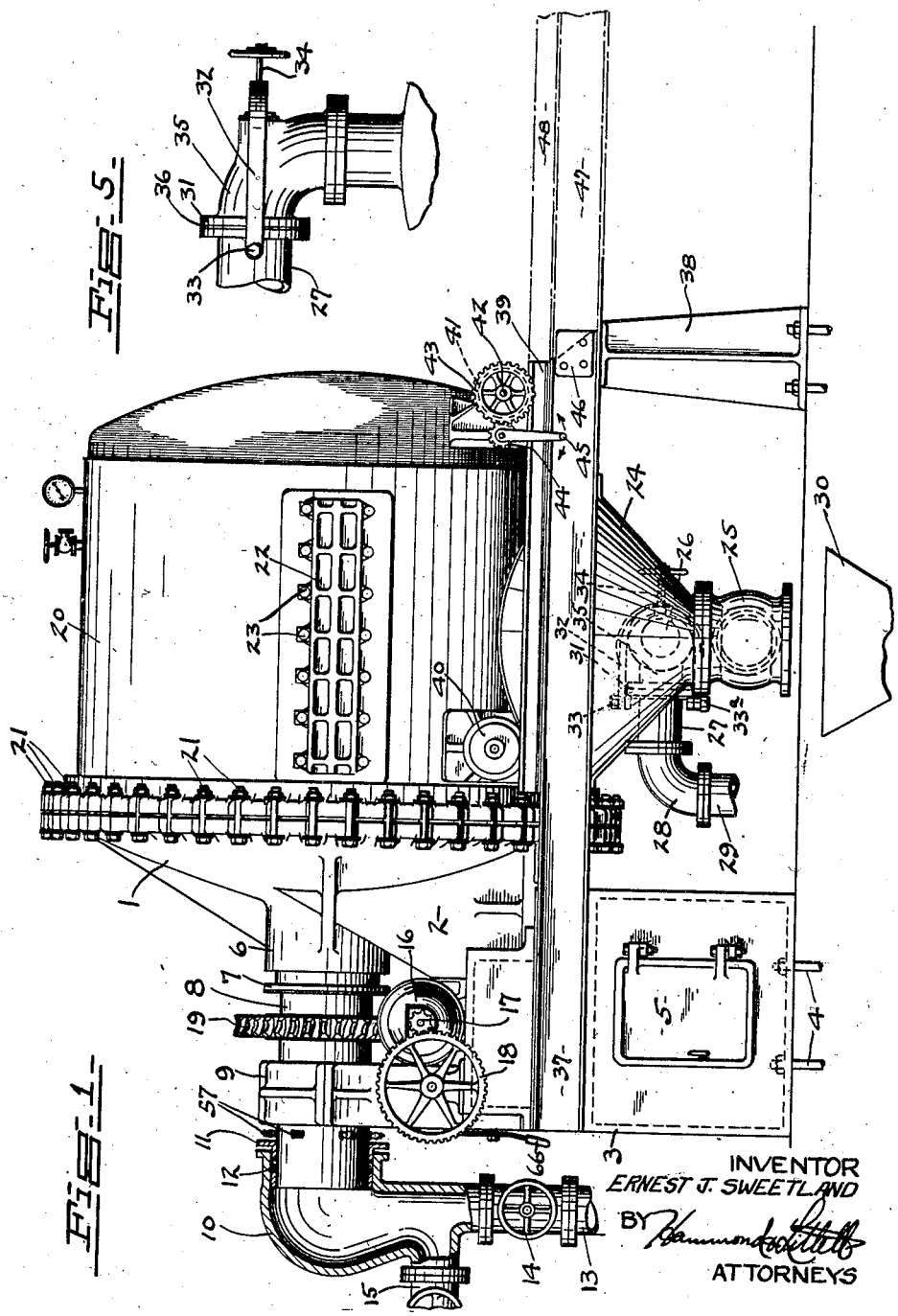

Referring to the drawings in detail and particularly Figure 1, the numeral 1 indicates a dished circular head casting supported by brackets 2 upon the supporting base 3, which is firmly bolted to a suitable foundation by the bolts 4. In order to utilize the space formed in the hollow base casting 3, doors 5 are provided on either side so that these spaces may be utilized as cupboards. The head casting 1, is provided with a hollow boss 6 which receives the gland 7 and provides a bearing and stuffing box for the rotating shaft 8 which passes through it and which is described in detail further on. A bearing 9 serves as a further support for the shaft 8. 10 is the filtrate collecting casting which is mounted in stationary position at the end of the shaft and is sealed thereto by the gland 11 and packing 12. This casting serves as a means of connecting pipe lines to communicate with the interior of the shaft 8, and in the drawing the pipe line 13 which is provided with the valve 14 is designed to lead the filtrate to any convenient receptacle whereas the valve 15 is connected with a source of compressed air or fluid under pressure for use in reversing current through the hollow shaft when desired.

Shaft 8 is caused to rotate by means of the motor 16 which communicates power to the shaft 8 through the pinion 17 and gear 18, the latter connecting through a transmission gearing with the worm wheel 19.

The filter shell or casing 20 is bolted to the head 1 by means of a plurality of bolts 21 and a gasket 80 (not shown in this view) so that by the union of head 1 and shell 20 a water tight casing is formed. On the side of the shell 20 a door 22 held in place by the bolts 23 covers a long slotted peep hole by means of which the interior of the filter may be inspected without the necessity of opening the casing.

At the bottom of the shell 20 there is a hopper 24 with a large flanged opening at the bottom to which is secured the discharge valve 25. A side opening 26 is provided on the hopper 24 which serves as an inlet for liquid to be filtered, or an outlet for liquids to be drained from the filter body. This opening communicates through pipe 27 and elbow 28 with the pipe 29 to which the various pipe lines to be described later on may be connected.

The hopper 30 is normally connected with a sewer or the like and acts as a receiver for residual matter discharged from the filter through valve 25.

It is desirable to have the filter so arranged that it may be opened for inspection or repair with as little delay as possible, and for that reason a special quick opening flange connection 31 is used for connecting pipe 27 and associate pipe lines with the opening 26. This is accomplishedd by means of a yoke 32 which is pivoted to the pipe 27 by means of the bolts 33 and 33A. A screw 34 passes through the yoke 33 and bears against the elbow 35 in such manner that the flange upon the pipe 27 and elbow 35 are drawn tightly together with the gasket 36, forming a sealed joint between them. When it is desired to open the filter it is necessary only to loosen the screw 34 and swing the yoke 32 clear of the elbow so that the flanges may part when the shell 20 reaches from the head 1. A plan view of this arrangement is clearly shown in Figure 5.

Along either side of the filter and firmly secured to the base 3 is a pair of I beams 37 and these rest at their outer ends on the supports 38. On the top of the I beams are mounted rails 39, and these in turn provide supports for the flanged wheels 40 and 41. The flanged wheels 41 and 41A are firmly fixed to the shaft 42 so that both wheels must rotate together, and to one end of the shaft 42 is keyed the gear 43 which meshes with pinion 44. The pinion 44 may be caused to rotate in either direction by means of crank 45.

The I beams 37 and rails 39 normally terminate at the top of the support 38, but by means of the guide plate 46 extension beams 47 which carry rails 48 may be placed in position when it is desired to open the filter. These extension beams which are shown in dot and dash lines are made removable so as to economize in floor space.

From the foregoing it will be clearly understood that if it is desired to open the filter for inspection or repair it is only necessary to remove the bolts 21 and rotate the crank 45 and thus cause the filter shell 20 to roll out upon the extension beams, thus exposing the entire interior construction of the filter for inspection or repairs.

Figure 2:
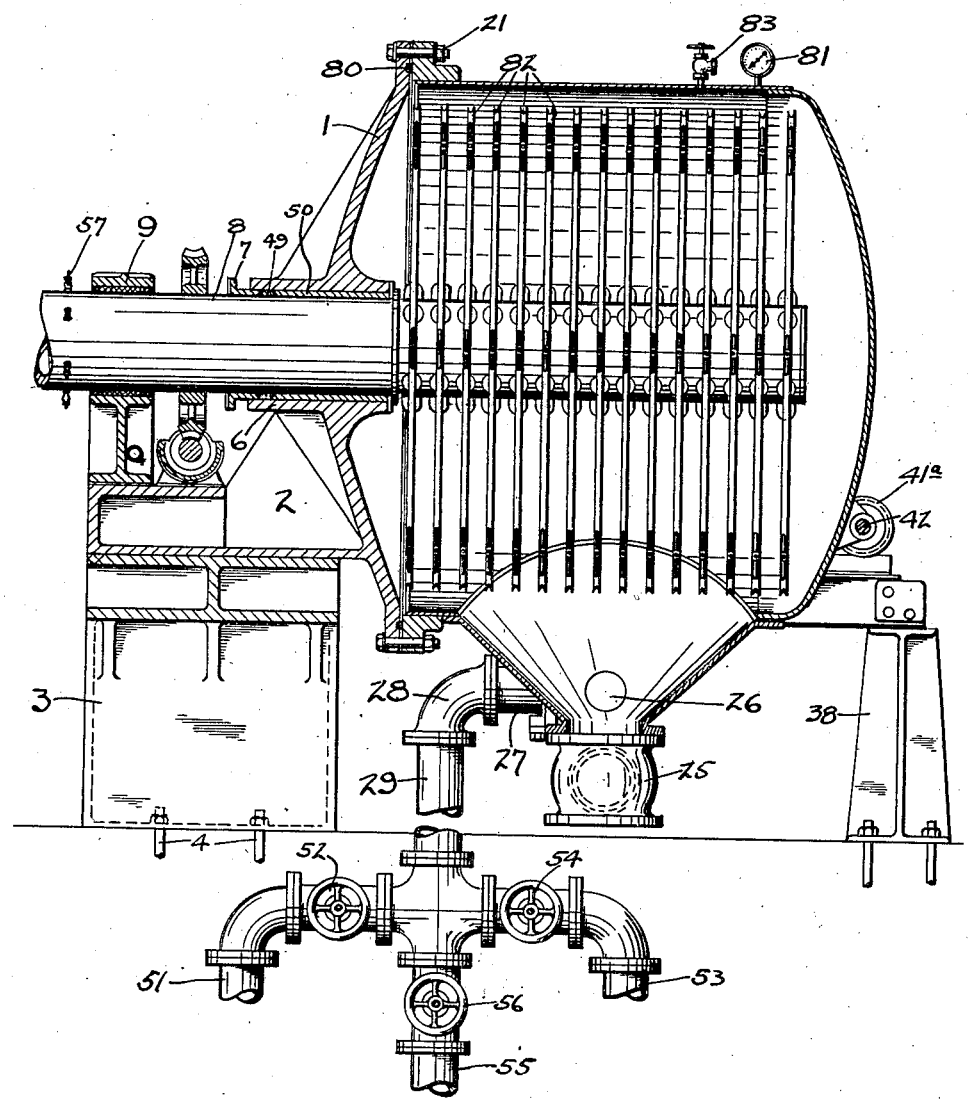
Figure 2 shows a sectional side elevation of the machine.

In the sectional view Figure 2 the filter elements are shown in place upon the shaft 8. This view represents filter elements of the sector type which are shown in elevation in Figure 6 and shows further details of the interior construction such as the gland 7 which bears against the packing 49 which is forced against the renewable bronze bushing 50 to form a water tight joint. In this view the pipe 51 provided with valve 52 is the main inlet for liquid to be filtered. The pipe 53 with valve 54 is the inlet for wash water and the pipe 55 with valve 56 serves as a drainage connection for returning excess unfiltered liquid or excess wash water to a suitable receptacle. Obviously this line may be subdivided into as many branches as desired for carrying the excess liquids to various departments of the plant, depending upon the process in which the filter is used.

Figure 6:
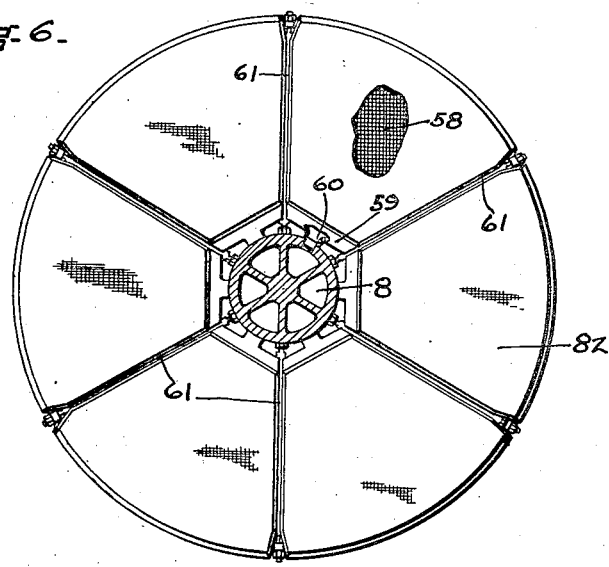
Figure 6 is a sectional elevation showing the shaft and sector type of filter element.

It will be understood from reference to Figure 6 that the shaft 8 is divided into six sector shaped compartments which correspond to the number of sectors on each disc. There is a double object in sectionalizing the shaft in this manner. In the first place it greatly increases the strength of the shaft, which is important in the cantilever type of construction, and secondly the subdivisions in the shaft maintain a separation in the flow of filtrate from each row of filter elements so that if a leak is detected by means of the test cocks 57 the operator can easily tell in which row of sectors the leak occurs and thus avoid looking over the entire filter area to locate a leak.

The filter sectors as shown in Figure 6 consist of a heavy wire screen 58 which terminates in a suitable casting 59 which delivers the filtrate through the nipple 60 to the interior of the shaft. The entire filter sector is covered with any suitable kind of metallic or textile filter cloth so that all liquid which passes through the nipple 60 must first pass through the filter cloth, a portion of which is represented as broken away to show the drainage screen 58. The sectors are held in position by means of the tie rods 61.

Figure 3:
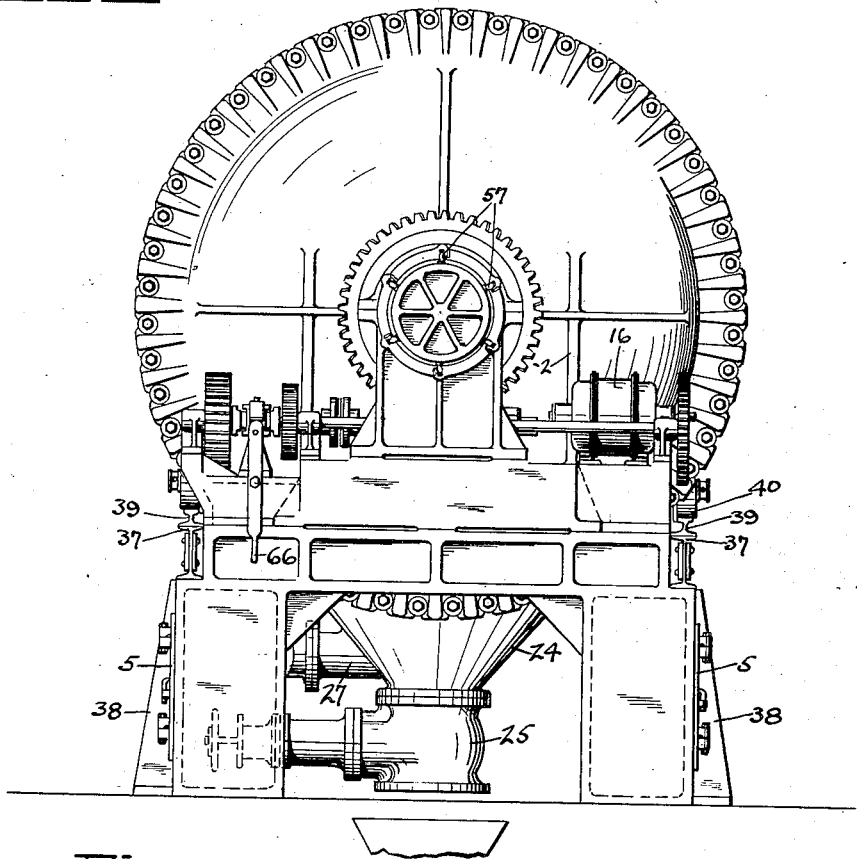
Figure 3 is an end elevation with filtrate receiving casting removed to show the radial partitions in the shaft and showing motor drive and multiple speed transmission arrangement.
Figure 4:
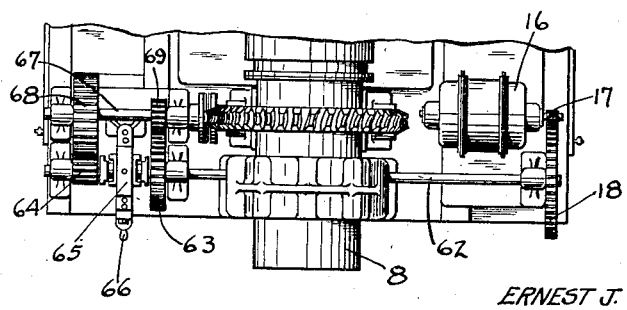
Figure 4 is a plan view of the motor drive and multiple speed transmission arrangement.

In a filter of this type it is sometimes desirable to have the shaft 8 so that it may be rotated at more than one speed. For instance during filtration it may rotate very slowly, say at the rate of 1 revolution per minute, while during discharging the operation is facilitated by a higher speed, say 5 revolutions per minute. The means of accomplishing this object is clearly shown in Figures 3 and 4. The motor 16 turns the pinion 17 and the gear 18, which rotates the shaft 62. This shaft is provided with the gear 63 and the pinion 64 on either side of the clutch 65, which is operated by the handle 66. If a slow rate of rotation of the shaft 8 is desired the clutch handle 66 is thrown toward the left thus causing the pinion 64 to rotate with the shaft 62, and the shaft 67 to which the worm is connected is caused to turn at slow speed by means of the gear 68, but if it is desired to rotate the shaft 8 at a higher rate of speed then the clutch handle 66 is thrown toward the right, when the gear 63 drives pinion 69 and the worm is thus rotated at a higher rate of speed. The mechanism is so arranged that when handle 66 is in vertical position as shown in the drawings the motor may idle without driving either of the gears, so that rotation of shaft 8 may be stopped without stopping the motor.

There are many advantages to be gained by the use of the sector shaped leaves as illustrated in Figure 6. For instance a repair may be made in any portion of the filter cloth with the removal of only one sector without disturbing any of the rest. Furthermore the sectors, being entirely separate from each other, do not allow the filtered liquid which gathers inside of the sectors to remain there for any considerable length of time, as each sector empties itself completely when it passes through the zenith of each revolution. This is of particular importance when washing the filter cake. For instance if a sugar solution is being filtered and it is desired to wash all of the sugar out of the cake the washing is much more complete and effective when the sectors are frequently emptied during rotation than is the case in a one piece filter disc where the heavier liquid remains in the bottom of the sectors and is worked out of the elements only by gradual dilution. However there are instances where it is of advantage to use filter elements made of a single one piece disc as shown in elevation in Figure 7 and in section in Figure 8. An advantage of this type of filter which does not apply to any other type of machine known to the inventor is that either type of filter element may be used with equal convenience.

If it is desired to use one piece filter discs then the sector shaped elements are all removed as are also the radial rods 61 and filter discs are slipped over the end of the shaft with spacing collars 70 placed between them.

Figure 7:
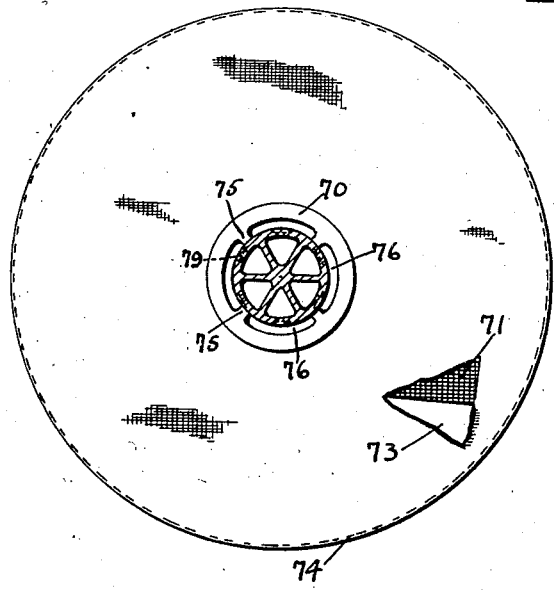
Figure 7 shows an end elevation of the same shaft with disc type of filter elements employed.
Figure 8:
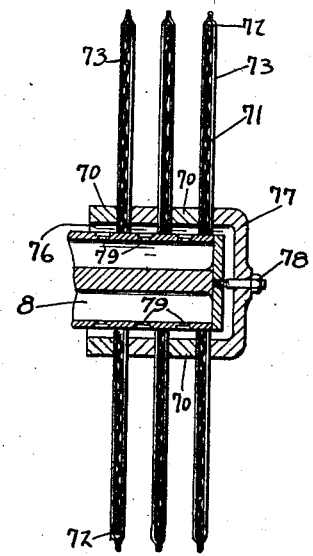
Figure 8 is a side view showing the end of shaft with disc type elements in place on the shaft.

Referring to Figures 7 and 8 which show the details of disc filter element construction, each disc is made from a circle of heavy wire screen 71 bound at the outer edges with a U shape 72 binding and covered with any suitable filter fabric 73, which is sewn together by the stitching at the outer edges 74. A circular opening is provided at the center of each disc so that it will fit loosely over the shaft 8. The collars 70 are provided with inwardly extending spacing lugs 75 to provide for the free passage of liquid through the channels 76, which are formed between the shaft and the collar. At the end of the series of discs is placed a cap 77, held in place by the nut 78 which furnishes means of tightening the discs against the collars and holding them firmly in position upon the shaft. The filter cloth 73 which is ordinarily used forms a gasket between the collars 70 and the filter discs so that when the whole series of filter elements or leaves are assembled no liquid can enter the shaft 8 without first passing through the filter cloth 73. By reason of the channels 76 and the fact that the discs fit loosely upon the shaft the filtrate finds its way through the opening 79 regardless of the spacing of the filter leaves, which may be varied to suit the case in question.

Method of operation

In describing the method of operation it will be assumed that sector shaped leaves as shown in Figure 6 are employed in the filter and that the filter shell 20 is tightly closed against the head 1 so as to compress the inserted gasket 80 to make a leak proof joint. While this filter is capable of handling a great many different materials, we shall assume in this description that the material being filtered is sugar syrup as is found in the ordinary sugar refinery and that disintegrated paper pulp is mixed with the syrup as an aid to filtration.

Assuming that the discharge valve 25 is closed, the valve 52 is opened and the unfiltered syrup with its contained paper pulp is forced into the filter casing through pipe 51 by any convenient means which will furnish the necessary pressure for filtration; such for instance as a centrifugal pump. While the filter shell 20 is being filled with syrup the motor 16 is started and the clutch lever 66 is thrown to the left so that a slow rotary motion is imparted to the shaft 8 and the filter elements attached to it. As the pump produces pressure within the shell 20, clear filtered syrup is forced through the filter elements 82 which drains through the shaft 8 out into the casting 10 and passes downwardly through the pipe 13 into any suitable receptacle. As filtration progresses the pressure as indicated by gage 81 gradually increases until a pressure of probably 40 pounds per square inch is reached. At this point a layer of accumulated impurities and paper pulp will have collected upon the surfaces of the filter elements 82 and will have formed a "cake" probably one half inch or more in thickness. At this point it is desirable to withdraw the excess unfiltered syrup from the filter body and at the same time to maintain a low pressure of compressed air against the filter cakes so that none may fall during the draining operation. To accomplish this purpose a compressed air connection with valve 83 is provided at the top of the filter and this valve communicates with a compressed air receiver. The valve 83 being opened, the valve 56 is opened and the excess unfiltered syrup is withdrawn from the filter body to any suitable receptacle through valve 56 and pipe 55. As soon as the filter casing has been drained valve 56 is closed and valve 54 is opened and wash water which is supplied through pipe 53 is forced into the filter body, which is rapidly filled and the valve 83 is then closed. The pressure with which the wash water is supplied through pipe 53 forces the water through the filter cakes and displaces the dissolved sugar which is contained in them, and this washing operation is continued until samples taken from the test cocks 57 show that washing is complete. This wash water follows the same path through valve 14 as does the filtrate except that it is assumed that a branch line leading from pipe 13 conveys "sweet water" to a separate receptacle.

The washing operation being completed valve 54 is closed and it is now desired to discharge the filter cake from the filter elements. Up to this point in the operation the filter leaves have been in constant rotation at slow speed. The clutch lever 66 is now shifted toward the right and the speed of rotation of the filter elements is thus increased. This rapid rotation of the elements while submerged in water, which by reason of the valve 54 being closed is no longer under pressure, causes the filter cake to disengage from the filter elements, and these cakes are more or less distintegrated by the agitation produced by the rotation of the filter elements. If desired at this point in order to assist the discharge of the cakes from the filter elements air or water under pressure may be admitted through valve 15 and forced in a reverse direction through the filter elements, while the valve 25 is opened to allow the discharge of the residues through the valve 25 into a hopper 30.

The residues having been discharged the valve 25 is now closed, valve 52 is opened, shift lever 66 is returned to the slow speed position and the entire cycle of operations repeated. It should be understood that a filter of this type is susceptible to many different methods of operation and that the foregoing is merely typical of one method which would commonly be employed. Where a residual cake adhering to the filter elements is of a particularly adhesive nature I may supply wash water to the surface of the filter elements for cleansing the same through a suitable series of spray or sluicing nozzles under pressure.

In the drawings the filter casing is mounted upon wheels to be movable, whereas the supports and head which carry the rotary shaft are in stationary position. Obviously the design could be reversed and the casing mounted in rigid position while the head and its attendant parts were mounted upon rollers to be withdrawn from the shell. One important feature of the invention is the separation of these parts one from another for inspection or repairs and to mount the casing in stationary position with the remaining parts upon rollers would be considered as within the scope of this invention.

While I have described certain apparatus as typical of my invention, it is understood that it is capable of various modifications without departing from the spirit of the invention as defined in the various claims.

What I claim is:

1. A filter having a horizontal shaft carrying a plurality of filter elements surrounded by a casing which is so mounted as to be movable in line with the axis of said shaft.

2. A filter having a horizontal shaft carrying a plurality of filter elements surrounded by a casing which is so mounted as to be movable in line with the axis of said shaft; a discharge opening in the bottom of said casing.

3. A filter having a horizontal revolvable shaft, a plurality of filter elements with filter surfaces at right angles to said shaft, a casing to enclose the filter elements, means for causing relative movement between the casing and the filter elements in line with the axis of the shaft to separate said casing and filter leaves.

4. A filter having a stationary base, a shaft mounted in a horizontal position upon said base, filter elments mounted upon the shaft and power means for rotating said shaft, a variable speed transmission for driving said shaft at more than one rate of speed.

5. A pressure filter having a two part casing, one of said parts comprising a horizontal cylindrical shell provided with a discharge hopper at the lowermost portion of the shell, and the other part comprising a closure for said shell, a rotary shaft carrying filter elements and driving means associated with the shaft and means for causing one of said parts to recede from the other in the direction of the axis of said shaft to open the filter.

6. A filter having a horizontal rotary shaft carrying a plurality of filter elements, a support for said shaft and a filter body cover mounted upon said support and provided with a joint forming surface lying in a substantially vertical plane, a cylindrical filter casing having an open end adapted to abut against said joint-forming surface, means for causing the casing and the shaft-supporting member to part in the direction of the axis of said shaft when desired to open the filter.

7. A filter comprising a supporting structure upon which is mounted a horizontal rotary drainage shaft, one end of said shaft extending beyond said support to act as a central carrying member for a plurality of filter elements which are enclosed within a liquid tight receptacle, means for causing said filter elements to rotate within said receptacle.

8. A filter having a horizontal rotary filter shaft supported at one end and unsupported at the other end, a plurality of filter elements mounted upon the unsupported end of said shaft.

9. A filter having a horizontal drainage shaft with one end rotatably mounted in a fixed support and the opposite end unsupported, a plurality of sector shaped filter elements secured to the unsupported end of the shaft, a filter casing adapted to surround said filter elements to enclose them in a leak proof chamber, a discharge hopper upon the lower side of said casing.

10. A filter for filtering sludge or pulp having a stationary end piece to form a closure for a filter casing, a stuffing box in said end piece and a rotary shaft passing through said stuffing box, said shaft having an outwardly extending unsupported portion to act as a carrier for a plurality of sector shaped filter elements, a casing to enclose said filter elements which forms a sealed joint against the end piece, and adapted to receive filter pulp or sludge, each of said filter segments extending into the bottom of said casing and adapted to continuously stir said filter pulp to prevent settling thereof.

11. A filter for filtering filter pulp having a stationary end piece to form a closure for a filter casing, a stuffing box in said end piece and a rotary shaft passing through said stuffing box, said shaft having an outwardly extending unsupported portion to act as a carrier for a plurality of disc shaped filter elements, filter elements on said shaft, each of which extends into the bottom of said filter, a casing to enclose said filter elements which forms a sealed joint against the end piece, said casing being filled with filter pulp, and means to build up a uniform cake on all the filter elements.

12. A filter comprising a stationary support carrying a horizontal rotary shaft supported in bearings at one end and having an outwardly extending portion unsupported at the other end, filter elements on said end, a movable filter casing which forms a leak proof filter chamber enclosing said filter elements, rails parallel to the axis of said shaft upon which said casing is movably mounted.

13. A filter having a shaft supported as a cantilever, a plurality of detachable rotary filter elements mounted upon the outwardly extending end of the shaft.

14. A filter having a horizontal rotary shaft mounted in bearings at one end and having the other end free, a plurality of disc shaped filter elements with central openings which may be installed upon the shaft or removed therefrom by passing them over the free end of the shaft.

15. A filter comprising a horizontal shaft supported at only one end and having filter elements mounted upon the unsupported end which rotate with the shaft, the unsupported end of said shaft being closed while the opposite end is open for the delivery of filtrate from longitudinal conduits in said shaft.

16. A pressure filter having a two part casing, one of said parts comprising a horizontal cylindrical shell provided with a discharge hopper at the lowermost portion of the shell, and the other part comprising a closure for said shell, a rotary shaft carrying filter elements and driving means associated with the shaft, and means for causing relative longitudinal movement between said parts to remove the shell from around the filter elements.

17. In a filter of the type described, a horizontal drainage shaft, a plurality of filter elements supported on said shaft, a two part casing adapted to form a liquid tight enclosure around said filter elements, means to rotate said shaft and filter elements, and means to cause relative movement of said casing parts in the direction of the axis of said shaft to uncover the filter elements.

18. In a filter of the type described, a horizontal drainage shaft, a plurality of filter elements supported thereon, a casing head through which said shaft extends, a casing body adapted to cooperate with said casing head to form a fluid-tight enclosure for said filter elements, an inlet pipe to said casing body, quick detachable means connecting said casing body and said head, quick detachable means connecting said casing body and said inlet pipe, and means for moving said casing body longitudinally away from said head and said inlet pipe when said detachable means are disconnected.

19. A filter having a rotary drainage shaft formed with a plurality of separate compartments, a plural sector filter mounted on said shaft each sector cooperating with a separate compartment of said shaft, and means one for each compartment for examining the contents of said compartments.

20. A filter having a horizontal drainage shaft formed with a plurality of separate compartments extending axially thereof, a plural sector filter mounted on said shaft each sector communicating with a separate compartment of the shaft and means one for each compartment for examining the contents of said compartments.

21. A filter having a horizontal drainage shaft formed with a plurality of separate compartments extending axially thereof, a plural section filter element mounted on said shaft each section communicating only with the adjacent separate compartment of the shaft and means one for each compartment for examining the contents of said compartments.

22. A filter comprising a horizontal shaft, filter elements on said shaft, a casing to enclose said elements, said casing having a fixed end thru which said shaft projects and means for mounting said casing and enabling it to be moved end-wise of the shaft to expose said elements.

In testimony whereof I have affixed my signature to this specification.

ERNEST J. SWEETLAND.